US007873641B2

(12) United States Patent
Frieden et al.

(10) Patent No.: US 7,873,641 B2
(45) Date of Patent: Jan. 18, 2011

(54) USING TAGS IN AN ENTERPRISE SEARCH SYSTEM

(75) Inventors: Kurt Frieden, Berkeley, CA (US); Dax Farhang, San Jose, CA (US); Samir Mahendra, San Francisco, CA (US); Jose Quezada, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 103 days.

(21) Appl. No.: 11/461,565

(22) Filed: Aug. 1, 2006

(65) Prior Publication Data

US 2008/0016098 A1 Jan. 17, 2008

Related U.S. Application Data

(60) Provisional application No. 60/807,438, filed on Jul. 14, 2006.

(51) Int. Cl.
*G06F 17/30* (2006.01)
(52) U.S. Cl. .................. 707/748; 707/723; 707/754
(58) Field of Classification Search .............. None
See application file for complete search history.

(56) References Cited

U.S. PATENT DOCUMENTS

| | | | |
|---|---|---|---|
| 5,627,886 A | 5/1997 | Bowman | |
| 6,026,388 A | 2/2000 | Liddy et al. | |
| 6,076,088 A | 6/2000 | Paik et al. | |
| 6,208,956 B1 * | 3/2001 | Motoyama | 704/2 |
| 6,401,096 B1 * | 6/2002 | Zellweger | 707/100 |
| 6,434,556 B1 | 8/2002 | Levin et al. | |
| 6,439,783 B1 | 8/2002 | Antoshenkov | |
| 6,591,265 B1 | 7/2003 | Erickson et al. | |
| 6,804,683 B1 | 10/2004 | Matsuzaki et al. | |
| 6,901,403 B1 * | 5/2005 | Bata et al. | 707/101 |
| 7,003,522 B1 * | 2/2006 | Reynar et al. | 707/10 |
| 7,058,628 B1 | 6/2006 | Page | |
| 7,194,458 B1 | 3/2007 | Micaelian et al. | |
| 7,251,637 B1 | 7/2007 | Caid | |
| 7,343,374 B2 | 3/2008 | Berkhin | |
| 7,356,530 B2 | 4/2008 | Kim et al. | |
| 2001/0054115 A1 * | 12/2001 | Ferguson et al. | 709/248 |
| 2002/0049738 A1 | 4/2002 | Epstein | |
| 2002/0059230 A1 | 5/2002 | Hunepohl et al. | |
| 2002/0087526 A1 | 7/2002 | Rao | |
| 2002/0129014 A1 | 9/2002 | Kim et al. | |

(Continued)

OTHER PUBLICATIONS

Pasmanter et al., "Cyclic Markov Chains with an Application to an Intermediate ENSO Model", Nonlinear Processes in Geophysics, 2003, pp. 197-210, vol. 10. Retrieved on Sep. 12, 2007, from URL: www.nonline-processes-geophys.net/10/197/2003/npg-10-197-2003.pdf.

(Continued)

*Primary Examiner*—Pierre M Vital
*Assistant Examiner*—Mohammad S Rostami
(74) *Attorney, Agent, or Firm*—Townsend and Townsend and Crew LLP

(57) ABSTRACT

An interface can allow for associating documents with tags. A search system can use connections between the tags and documents to determine search-independent rank values for the documents. The search-independent rank values can be combined with term matching indications to get a total relevance of the document.

18 Claims, 12 Drawing Sheets

U.S. PATENT DOCUMENTS

| | | | |
|---|---|---|---|
| 2003/0023570 A1 | 1/2003 | Kobayashi et al. | |
| 2003/0033288 A1* | 2/2003 | Shanahan et al. | 707/3 |
| 2003/0084048 A1* | 5/2003 | Dweck et al. | 707/10 |
| 2003/0120671 A1* | 6/2003 | Kim et al. | 707/100 |
| 2003/0140037 A1 | 7/2003 | Deh-Lee | |
| 2003/0154359 A1* | 8/2003 | Henry et al. | 712/209 |
| 2003/0163363 A1 | 8/2003 | Pratte et al. | |
| 2003/0204502 A1* | 10/2003 | Tomlin et al. | 707/5 |
| 2003/0208482 A1 | 11/2003 | Kim et al. | |
| 2003/0217047 A1 | 11/2003 | Marchisio | |
| 2003/0225750 A1 | 12/2003 | Farahat | |
| 2003/0237051 A1* | 12/2003 | LaMarca et al. | 715/513 |
| 2004/0015495 A1 | 1/2004 | Kim et al. | |
| 2004/0078363 A1 | 4/2004 | Kawatani | |
| 2004/0111412 A1 | 6/2004 | Broder | |
| 2004/0117354 A1 | 6/2004 | Azzaro et al. | |
| 2004/0133589 A1* | 7/2004 | Kiessig et al. | 707/102 |
| 2004/0139059 A1* | 7/2004 | Conroy et al. | 707/3 |
| 2004/0162827 A1 | 8/2004 | Nakano | |
| 2004/0210661 A1* | 10/2004 | Thompson | 709/228 |
| 2005/0027685 A1 | 2/2005 | Kamvar | |
| 2005/0065908 A1 | 3/2005 | Silverbrook et al. | |
| 2005/0071741 A1 | 3/2005 | Acharya et al. | |
| 2005/0076001 A1* | 4/2005 | Gauthier et al. | 707/1 |
| 2005/0086215 A1 | 4/2005 | Perisic | |
| 2005/0154699 A1 | 7/2005 | Lipkin et al. | |
| 2005/0165757 A1* | 7/2005 | Broder | 707/3 |
| 2005/0165762 A1 | 7/2005 | Bishop | |
| 2005/0171742 A1 | 8/2005 | Bennighof | |
| 2005/0216827 A1* | 9/2005 | Mochizuki | 715/511 |
| 2005/0222975 A1 | 10/2005 | Nayak et al. | |
| 2005/0223313 A1* | 10/2005 | Geraud | 715/511 |
| 2005/0256860 A1 | 11/2005 | Eiron et al. | |
| 2005/0256867 A1 | 11/2005 | Walther et al. | |
| 2006/0026128 A1* | 2/2006 | Bier | 707/3 |
| 2006/0041535 A1 | 2/2006 | Qamhiyah et al. | |
| 2006/0041548 A1 | 2/2006 | Parsons et al. | |
| 2006/0047643 A1* | 3/2006 | Chaman | 707/3 |
| 2006/0047656 A1 | 3/2006 | Dehlinger et al. | |
| 2006/0080314 A1* | 4/2006 | Hubert et al. | 707/5 |
| 2006/0080321 A1 | 4/2006 | Horn et al. | |
| 2006/0080335 A1* | 4/2006 | Freeborg et al. | 707/100 |
| 2006/0106793 A1 | 5/2006 | Liang | |
| 2006/0112111 A1 | 5/2006 | Tseng et al. | |
| 2006/0117012 A1 | 6/2006 | Rizzolo et al. | |
| 2006/0143175 A1 | 6/2006 | Ukrainczyk | |
| 2006/0143236 A1 | 6/2006 | Wu | |
| 2006/0149720 A1 | 7/2006 | Dehlinger | |
| 2006/0184539 A1* | 8/2006 | Blake et al. | 707/10 |
| 2006/0190488 A1 | 8/2006 | Cohen et al. | |
| 2006/0200556 A1 | 9/2006 | Brave | |
| 2006/0218100 A1 | 9/2006 | Silverbrook et al. | |
| 2006/0218114 A1* | 9/2006 | Weare et al. | 707/1 |
| 2006/0238381 A1 | 10/2006 | Kimchi et al. | |
| 2006/0242554 A1* | 10/2006 | Gerace et al. | 715/501.1 |
| 2006/0248076 A1* | 11/2006 | Troy et al. | 707/5 |
| 2006/0259475 A1 | 11/2006 | Dehlinger | |
| 2006/0259481 A1 | 11/2006 | Handley | |
| 2006/0282328 A1 | 12/2006 | Gerace et al. | |
| 2006/0294086 A1 | 12/2006 | Rose et al. | |
| 2006/0294124 A1 | 12/2006 | Cho | |
| 2006/0294134 A1 | 12/2006 | Berkhim et al. | |
| 2007/0011073 A1 | 1/2007 | Gardner et al. | |
| 2007/0011155 A1 | 1/2007 | Sarkar | |
| 2007/0016599 A1 | 1/2007 | Plastina et al. | |
| 2007/0027840 A1 | 2/2007 | Cowling | |
| 2007/0038614 A1 | 2/2007 | Guha | |
| 2007/0043723 A1 | 2/2007 | Bitan et al. | |
| 2007/0043761 A1 | 2/2007 | Chim et al. | |
| 2007/0061219 A1 | 3/2007 | Palestrant et al. | |
| 2007/0078828 A1 | 4/2007 | Parikh et al. | |
| 2007/0078832 A1* | 4/2007 | Ott et al. | 707/3 |
| 2007/0088832 A1 | 4/2007 | Tsang et al. | |
| 2007/0106659 A1* | 5/2007 | Lu et al. | 707/5 |
| 2007/0112761 A1 | 5/2007 | Xu et al. | |
| 2007/0118515 A1 | 5/2007 | Dehlinger | |
| 2007/0124299 A1 | 5/2007 | Martin et al. | |
| 2007/0136429 A1* | 6/2007 | Fine et al. | 709/206 |
| 2007/0136657 A1 | 6/2007 | Blumenthal | |
| 2007/0174275 A1 | 7/2007 | Kan et al. | |
| 2007/0179958 A1 | 8/2007 | Chen | |
| 2007/0185858 A1 | 8/2007 | Lu et al. | |
| 2007/0208613 A1* | 9/2007 | Backer | 705/10 |
| 2007/0214133 A1 | 9/2007 | Liberty et al. | |
| 2007/0244903 A1 | 10/2007 | Ratliff et al. | |
| 2007/0250500 A1 | 10/2007 | Ismalon | |
| 2008/0005064 A1 | 1/2008 | Sarukkai | |
| 2008/0005086 A1* | 1/2008 | Moore | 707/3 |
| 2008/0010615 A1 | 1/2008 | Curtis et al. | |
| 2008/0016052 A1 | 1/2008 | Frieden | |
| 2008/0016053 A1 | 1/2008 | Frieden et al. | |
| 2008/0016061 A1 | 1/2008 | Frieden et al. | |
| 2008/0016071 A1 | 1/2008 | Frieden et al. | |
| 2008/0016072 A1 | 1/2008 | Frieden et al. | |

OTHER PUBLICATIONS

International Search Report for PCT/US07/00750, dated Mar. 3, 2008, 8 pages.
International Search Report for PCT/US07/00748, dated Feb. 19, 2008, 12 pages.
International Search Report for PCT/US07/00742, dated Feb. 19, 200, 10 pages.
Langville, "Deeper Inside PageRank", Oct. 20, 2004, 33 pages, Internet Mathematics.
Gleich, et al., "Fast Parallel PageRank: A Linear System Approach", May 2005, 8 pages, YAHOO Labs.
Non-Final Office Action for U.S. Appl. No. 11/461,549 mailed on Apr. 25, 2008; 22 pages.
Final Office Action for U.S. Appl. No. 11/461,549 mailed on Aug. 14, 2008; 26 pages.
Non-Final Office Action for U.S. Appl. No. 11/461,549 mailed on Dec. 16, 2008; 71 pages.
Non-Final Office Action for U.S. Appl. No. 11/461,555 mailed on Apr. 29, 2008; 23 pages.
Final Office Action for U.S. Appl. No. 11/461,555 mailed on Aug. 14, 2008; 25 pages.
Non-Final Office Action for U.S. Appl. No. 11/461,555 mailed on Oct. 28, 2008; 27 pages.
Non-Final Office Action for U.S. Appl. No. 11/461,568 mailed on Jan. 12, 2009; 31 pages.
Non-Final Office Action for U.S. Appl. No. 11/461,575 mailed on May 14, 2008; 20 pages.
Non-Final Office Action for U.S. Appl. No. 11/461,575 mailed on Sep. 17, 2008; 24 pages.
Final Office Action for U.S. Appl. No. 11/461,575 mailed on Dec. 16, 2008; 27 pages.
Non-Final Office Action for U.S. Appl. No. 11/461,588 mailed on Mar. 30, 2009; 22 pages.

* cited by examiner

302 →

$$\begin{pmatrix} 0 & 0 & 0 & 0 & 0 & 1 & 0 & 0 \\ 3/14 & 0 & 0 & 0 & 1 & 0 & 0 & 0 \\ 0 & 0 & 0 & 0 & 0 & 0 & 0 & 0 \\ 1/14 & 0 & 0 & 0 & 0 & 0 & 0 & 0 \\ 0 & 1/2 & 1/3 & 0 & 0 & 0 & 1 & 0 \\ 5/7 & 1/8 & 0 & 0 & 0 & 0 & 0 & 0 \\ 0 & 3/8 & 1/3 & 0 & 0 & 0 & 0 & 0 \\ 0 & 0 & 1/3 & 0 & 0 & 0 & 0 & 0 \end{pmatrix} \vec{x} = \vec{x}$$

304 → (row 6: 5/7, 1/8, ...)

USING TAGS IN AN ENTERPRISE SEARCH SYSTEM

CLAIM OF PRIORITY

This application claims priority to U.S. Provisional Application No. 60/807,438 entitled "Improved Enterprise Search System", filed Jul. 14, 2006, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosures as it appears in the Patent and Trademark Office patent file or records, but otherwise reserves all copyright rights whatsoever.

BACKGROUND OF INVENTION

Search systems want to improve the quality and relevance of the top hits to improve the chances that the documents found by the searcher will be the documents that the searcher is looking for. Google™ uses the concept of links between documents in the Internet to determine page rank. Pages linked to by other highly ranked pages are ranked relatively high. The Google™ approach is ineffective for enterprise portal and other enterprise wide document systems since documents in such systems tend not to be highly interlinked.

BRIEF DESCRIPTION OF THE DRAWINGS

FIG. 3 shows an example of a matrix of one embodiment.

FIG. 5 illustrates an exemplary search page.

FIGS. 7A-7B illustrates tag administration pages.

DETAILED DESCRIPTION

Figure 1A:
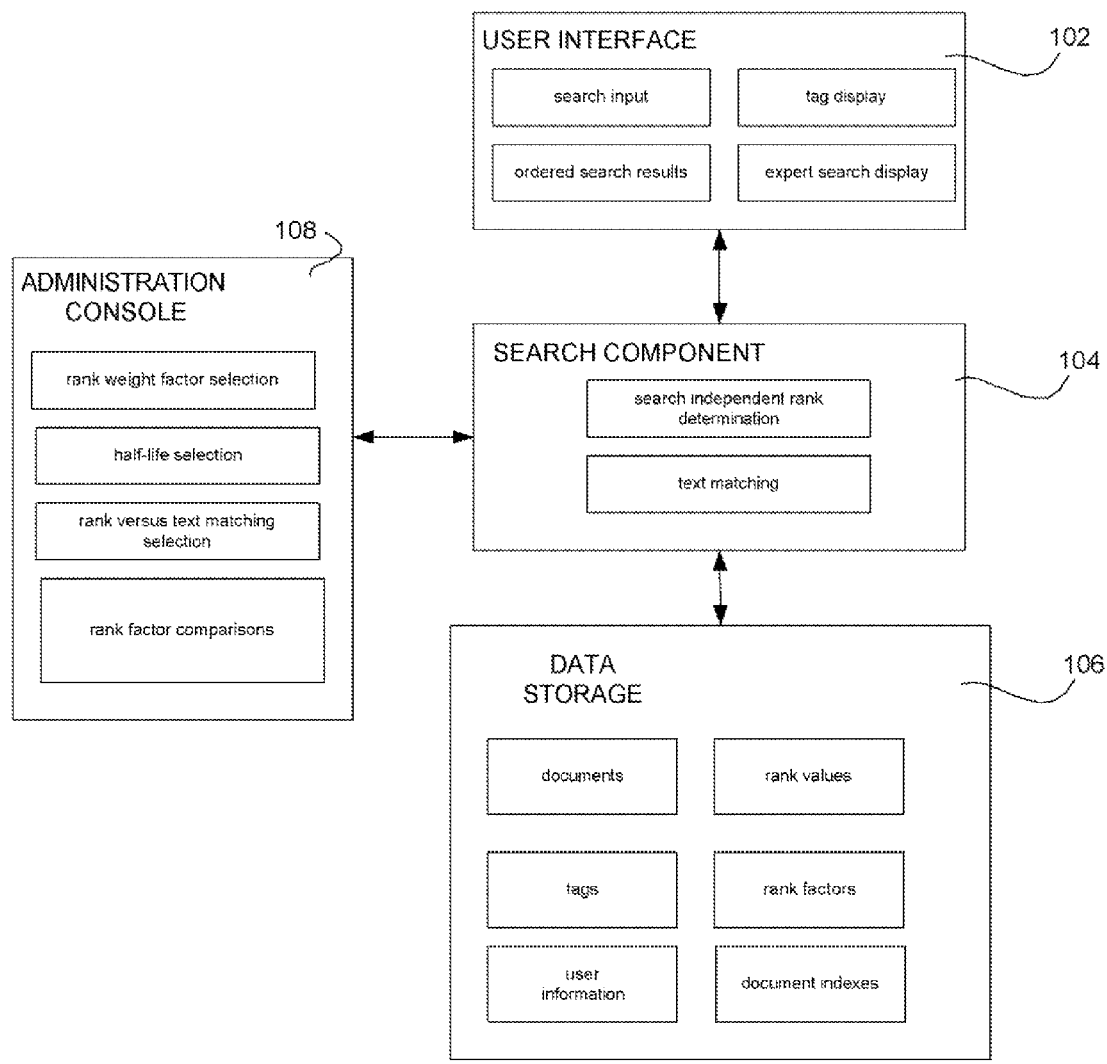
FIG. 1A is a diagram of one embodiment of the present invention.

FIG. 1A shows an exemplary system of the present invention. User interface 102 can be a web page or other interface for getting user information and displaying results to a user. The user interface 102 can be used to input search terms to find objects. The objects can include documents, users, and tags. The documents can include word processing documents, images, web pages, discussion threads and any other type of files. The user interface 102 can be used to display search results including ordered search results. Tags associated with the documents can also be displayed. Software component 104 can use information stored in memory 106 to provide functions of the present invention.

The search component 104 can produce search independent ranks for objects in the system. The search component 104 can also provide for text matching of objects. The ordered results provided to the user can be a function of the search independent object rank and the text matching. This function and other rank factors can be selected by a system administrator from administrative console 108.

Each object (user, document and tag) can have search-independent rank of its quality which does not depend on any search query. Each object's search-independent rank can be calculated before search time. This search-independent rank can be combined with a text matching score at search time to determine the order of results. For example, in one embodiment, where a is a value from 0 to 1.

Relevance=$a$(search independent document rank)+ $(1-a)$(text matching score)

The search-independent ranks can be determined in a variety of ways. For example, the search independent ranks objects can be seen as contributions from other objects based on a combination of actions with their associated weights and the contributor object's rank. In one embodiment, the search independent object rank can implemented using matrix equations, such as using a damped, positive, column-stochastic matrix.

Figure 1B:
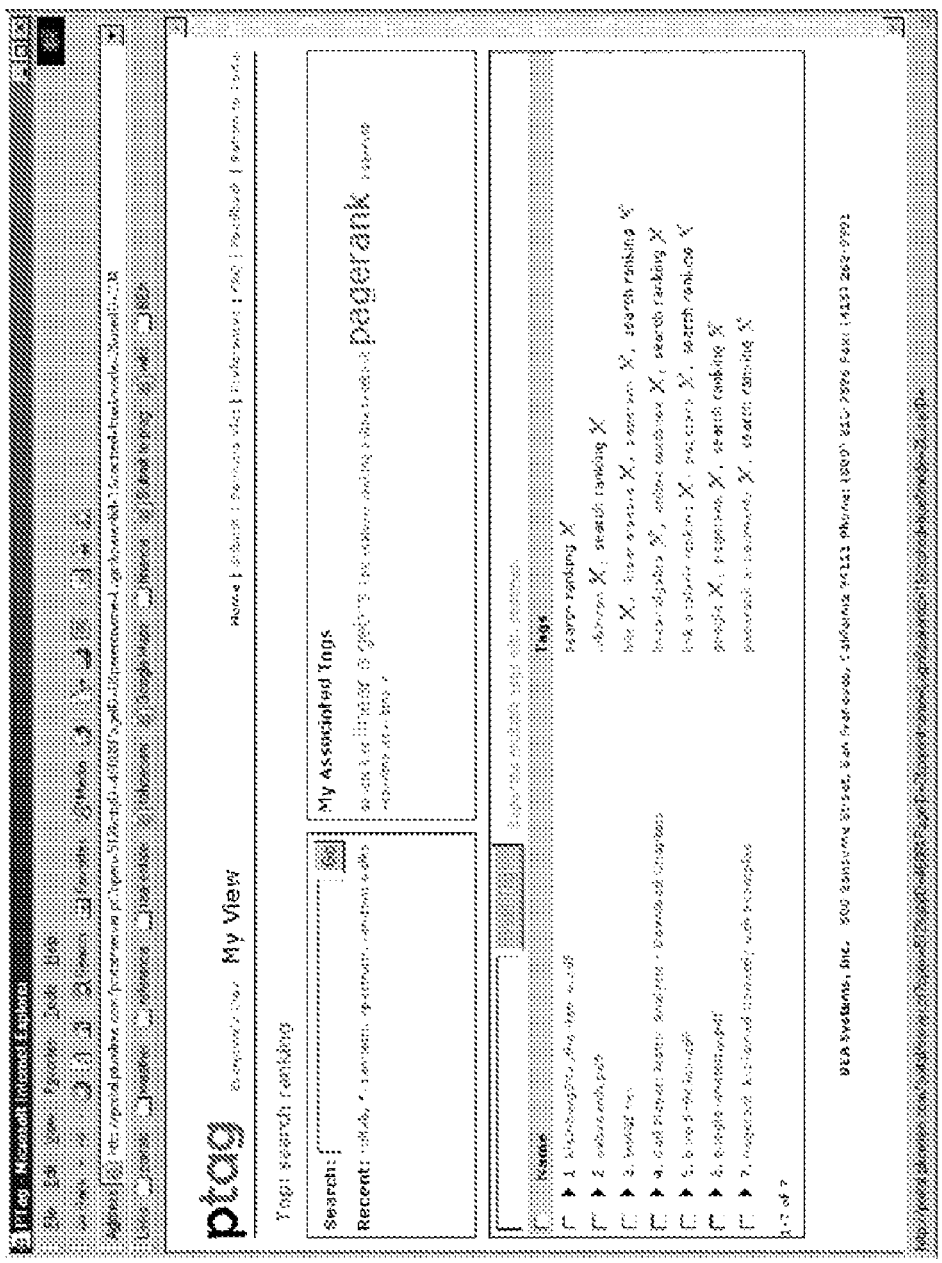
FIG. 1B is a search display page showing tags associated with documents.

FIG. 1B shows an exemplary display showing the use of tags to search for documents to the displayed associated with search for documents.

Object Rank Calculation

Embodiments of the present invention concern search independent object rank calculations. In one embodiment, coefficients indicating connections between objects can be calculated. These coefficients can be determined based on user actions such as creating, viewing, and tagging documents. In one example, user actions are given a selectable action weight in calculating the coefficients. The coefficients can be used to calculate rank values for the objects.

In one embodiment, the rank of a user can depend on:
The rank and number of pages and tags she creates
The rank and number of users who tag, view, and add her as a contact In one embodiment, the rank of a page can depend on:
The rank of its author
The rank and number of users who tag and view it In one embodiments, the rank of a tag can depend on:
The rank and number of people who apply and use it
The rank and number of page to which it is applied The ranking schema can be separate from the search schema and it can be supported on a different database server. This can isolate real-time production systems from the impact of the ranking calculation.

A static copy of the ranking schema can be obtained for the rank calculation. This allows for data integrity and isolation.

The coefficients can be part of a matrix indicating connections between objects, such as documents, tags and users. The matrix can be used to calculate a modified matrix, such as a damped matrix, used to calculate an eigenvector solution containing the ranks.

Figure 2A:
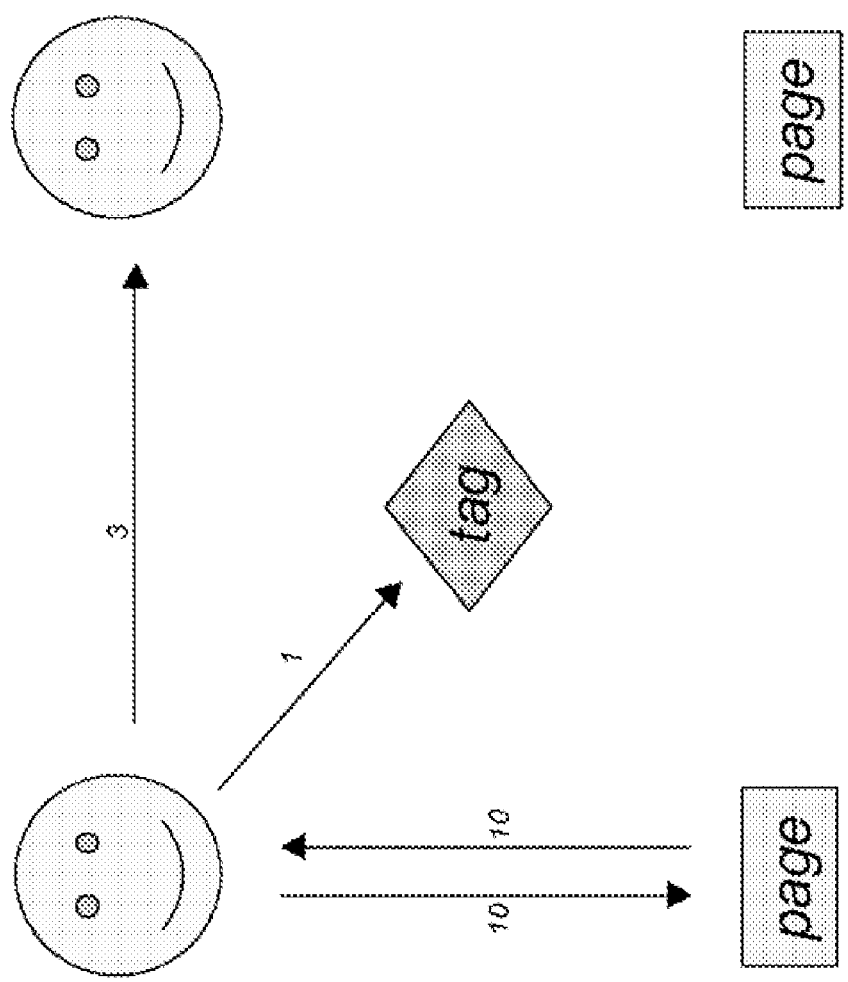
FIGS. 2A-2C illustrates an exemplary approach to creating a document rank of one embodiment.
Figure 2B:
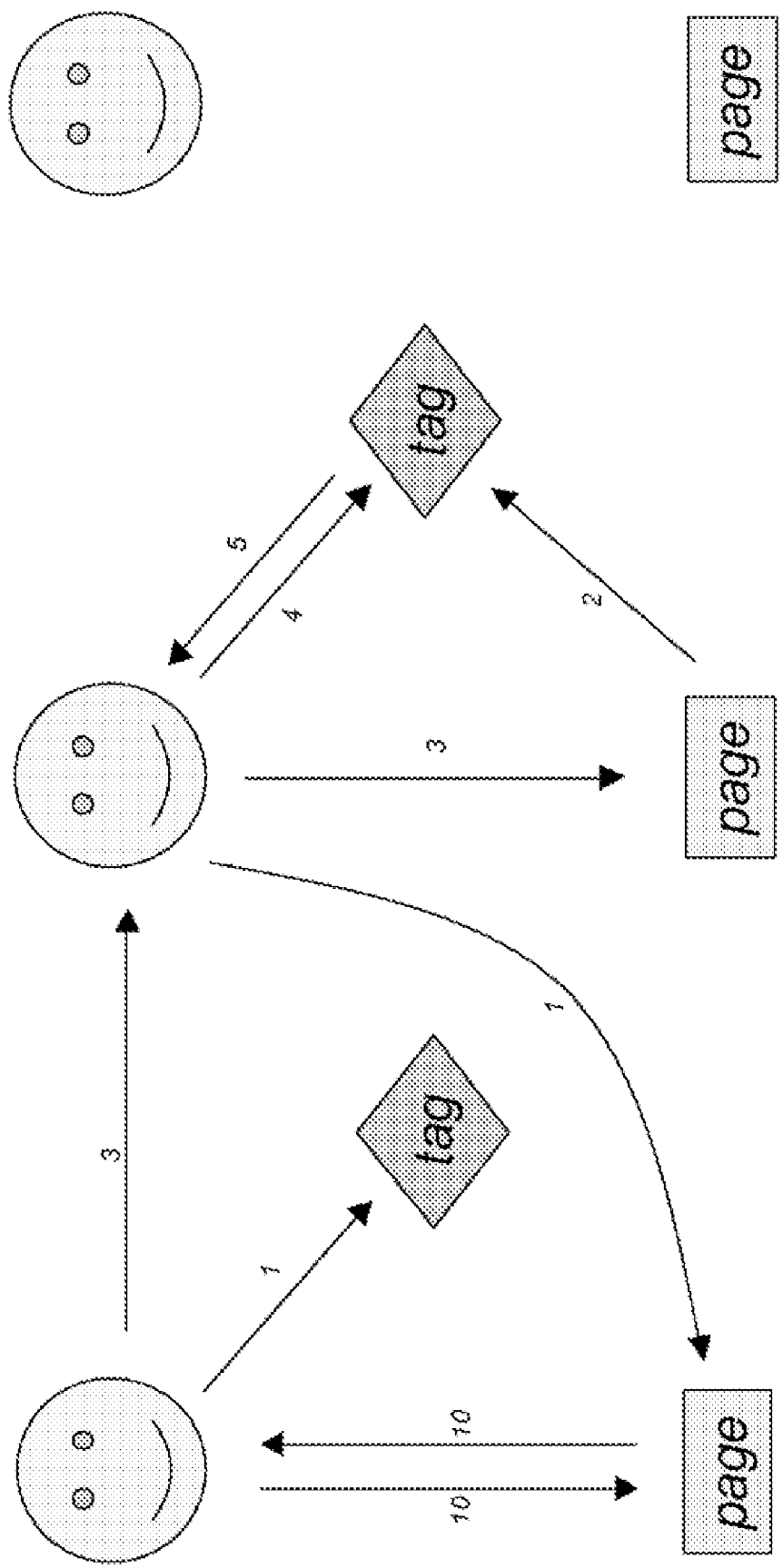
Figure 2C:
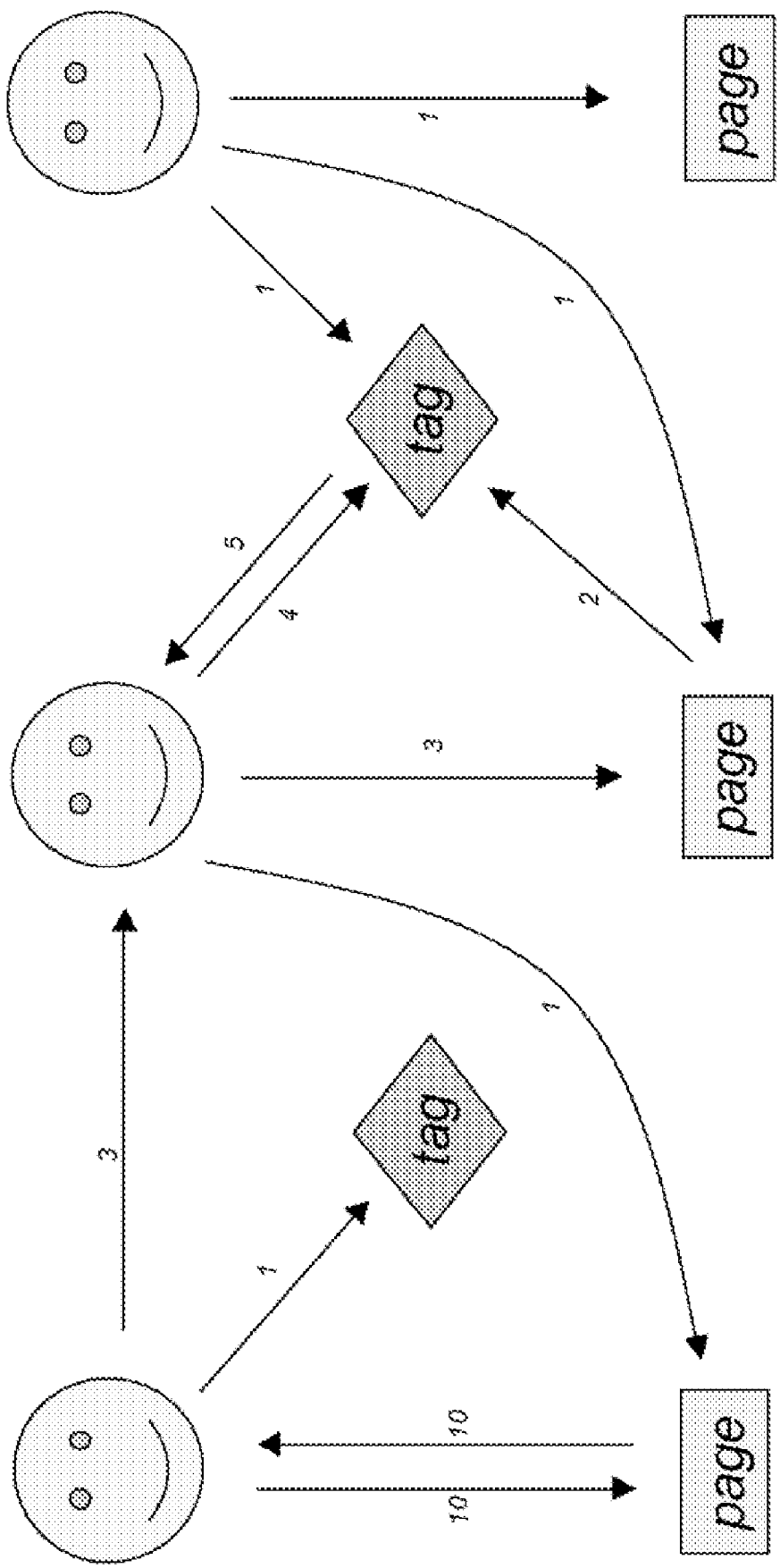

FIGS. 2A-2C show one example of a method to determine connections between objects, such as documents, users and tags. In this example, directed lines show authority given from one object to another. In FIG. 2A, Bill creates a page (producing a weight of "10" to the page and vice versa), clicks on a tar (giving a weight of "1" to the tag); and adds a user Jill to his contacts (giving a weight of "3" to Jill). FIGS. 2B and 2C show the result of Jill's and Jack's actions.

FIG. 3 shows an example of a matrix for the example of FIGS. 2A-2C. A column of the matrix shows an object's contribution to other objects expressed as a ratio of the object's total contribution to all of the other objects. For example, column 302 has the coefficients of the contribution of Jill to other objects. The rows indicate the coefficients of the incoming contributions to an object. For example, row 304 indicates the coefficients of incoming contributions for page 1.

In FIG. 3, X is an eigenvector of the matrix equation. The coefficients of the eigenvector could indicate the search independent rank values of the objects. Because of the size of the matrix, it can be hard to find the eigenvector solution to such a matrix equation. As described below, one way to obtain rank values is to use a damped matrix that can be solvable using the Perron-Frobenius Theorem.

The objects in the system can be enumerated $O_1, \ldots O_n$. $W_{ij}$ can denote the total weight of all the connections between $O_j$ and $O_i$ divided by the total weight of all of $O_j$'s connections, $x_i$ can denote the coefficient for object $O_i$ of eigenvector X of FIG. 3. This means:

$$x_i = W_{i1}x_1 + \ldots + W_{in}x_n.$$

which is a series of n equations with n unknowns.

The formula can be slightly modified so that it can be solved using the Perron-Frobenius Theorem. $g_i$ can denote the rank of $O_i$. The parameter d can be a damping factor that can be set between 0 and 1. W can be the n×n matrix whose entries are $W_{ij}$, g can the 1×n column vector whose coefficients are $g_i$, and E can be the matrix whose entries are all 1/n. The damped formula can be expressed as:

$$g = Gg$$

where $$G = (1-d)W + (d)E$$

Because of the damping G is positive. W by itself is usually not positive and typically has many zero coefficients. Because E and W are both column-stochastic with the values in each column adding up to 1, G is column-stochastic. W is column-stochastic because the values in each column represent the relative outgoing connection weights for each object.

The Perron-Frobenius Theorem tells us that lim k→infinity $G^k g_0$ exists for any choice of an initial starting vector $g_0$, as long as its coordinates add up to 1. The theorem also states that the limit is an eigenvector of G with eigenvalue 1, so the limit must be g. This provides a way to calculate g. The initial vector $g_0$, can be repetitively multiplied with the matrix until the values settle down. The initial vector $g_0$ can be [1/n, ..., 1/n].

Other Initial vectors can also be used. In one embodiment, the coefficients relating to different object categories, such as users, tags and documents, in $g_o$ can use different constants. For example, if users as a category tend to be ranked higher than documents as a category, the initial vectors values can reflect this.

Alternately, $g_o$ can be calculated by setting $g_o$ equal to the sum of all of the coefficients of the row i of G scaled by a factor to make the sum of the coefficients of $g_o$ equal to 1.

$g_0$ can be determined from a previously calculated rank vector. For example, if objects have been added, the coefficients of the previous rank vector can be used to determine some of the initial rank vectors values. New objects can be assigned constants for the initial vector.

The $g_0$ can also be the result of one of more multiplications of a precursor vector with the undamped matrix followed by a rescaling.

Matrix Calculation Method

One embodiment of the present invention comprises a computer-implemented method for operating on a large matrix that is too unwieldy to maintain in local memory. Such a method can be used for the matrix calculation of object ranks. The method can include using a core data structure. The core data structure can be stored in external memory and brought in to local memory row by row for the calculation.

In one embodiment for each row of a core data structure, a row of the core data structure is brought into local memory. The row can be inflated by inserting missing zeros in the row. This can be significant if the matrix is a sparse matrix. The inflated row can be converted into a row of a damped matrix. The damped matrix can be positive and column-stochastic. The row the damped matrix can be multiplied by the current vector to get a value of the next vector. For example:

row$_i$×old vector=next vector[i]

The next vector can be compared with the current vector to get a difference value. If the difference value is greater that a minimum error value, the next vector can be set as the current vector and the steps can repeat otherwise, a result is determined from the next vector.

In one example, the next vector is used to determine the ranks of objects.

The core, data structure can include skip counts since the core data structure is likely to be sparse. Skip counts can indicate the number of zero coefficients between each non-zero coefficients of the sparse matrix and thus allow the core data structure to be inflated.

In one embodiment, the first byte of a skip count can encode a number of next zero values in a row if the number is less than a threshold or an indication of additional bytes that encode the number if the number is greater that a threshold. This can aid in the packing of the core data structures.

Figure 4:
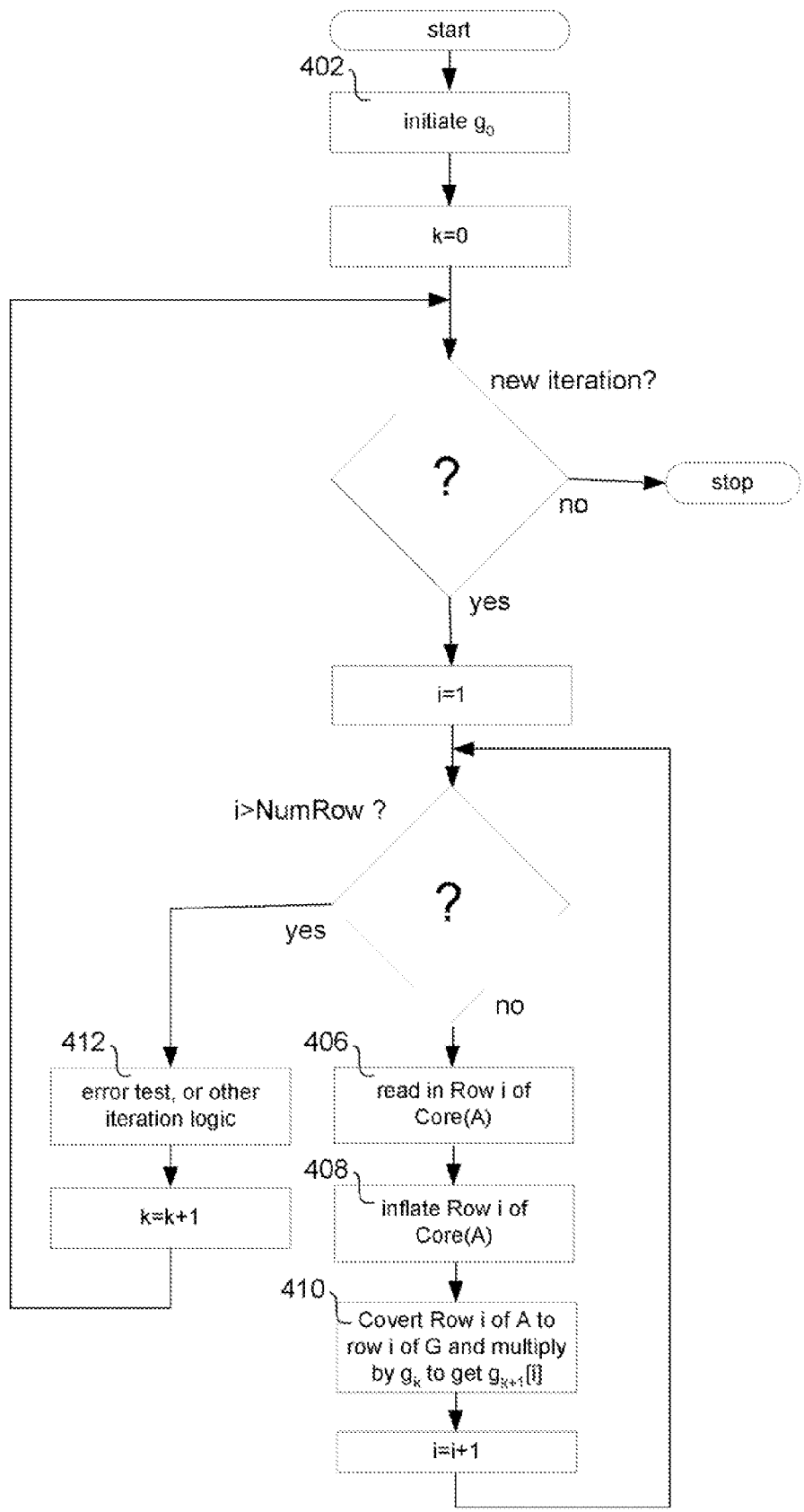
FIG. 4 illustrates a flow chart of one embodiment.

FIG. 4 shows an example of an exemplary method. Step 402 includes initializing the initial vector $g_o$. One example of a $g_o$ is the vector [1/n, ... 1/n] whose coefficients add up to "1".

In one embodiment, for each iteration of the algorithm, for i=1 to numRows:
Read in row of core(A) (step 406)
Inflate this into one row of A (step 408)
Convert this into a row G and multiply this row by $g_k$ to produce $i^{th}$ element of $g_{k+1}$ (step 410)
  In detail: for j=1 to numColumn
    Stochasticise $a_{ij}$ using the $j^{th}$ column sum
    Use damping to produce $g_{ij}$
    $g_{k+1}[l] += g_{ij} * g_k[k]$
Calculate $e_k$ from $g_k$ and $g_{k+1}$ As shown in step 412, the method can repeat until an error condition is met. Alternately the method can be repeated for a fixed number of times as shown in step 412.

Tag-Based Enterprise System

One embodiment of the present invention is a tag-based system for the enterprise. Users can apply tags to objects. The tags can be used to provide user access to enterprise objects, such as documents.

One embodiment of the present invention is a system that automatically creates initial tags for objects. The tags can automatically be created based on document location information. For example, documents in a folder entitled "project X" can be given that name as an initial tag. Existing document metadata can also be used to create initial tags. For example, Word™ or other types of documents can have metadata that can be examined to determine tags.

Initial tags can automatically be created using translation rules. The translation rules can be such that if a first term is associated with the document, a second term can be used as the initial tag. For example, all documents with the folder name "Jamesk" can be associated with a tag "James Kite" if a translation rule so indicates this relationship. The first term can be a folder name, metadata, a document name or other type of term.

Tagging can allow users to accurately define the knowledge encapsulated by the content in a distributed fashion. Tags can be terms associated with objects. However, unlike traditional document metadata or properties, tags can be primarily defined by the content users. Tag ownership and administration can be decentralized. While a document property can be defined by a single individual, the user base as a whole can determine the knowledge embodied by a particular document.

The tags can form a folksonomy. Unlike taxonomies that are rigid these folksonomies can be constantly evolving to reflect the aggregated wisdom of the user base.

System users can still be able to utilize document metadata as search criteria or to further refine result sets. This can ensure that results are returned when no applicable tags exist. When exposed as a preference, it can allow individuals to choose whether they trust the crowd or a single individual. For example, a user might select the tag named "operator" and sort or filter the result set to display document authored by Jane Smith.

The application can also be able to auto-tag documents with terms using document metadata or logical attributes of the document using a system rule.

The tags can be used in a search for users. One embodiment of the present invention can include associating users with tags and using connections between the tags and users to determine rank values for the users.

The connections between the user and objects can be used to classify the users. Users can be classified as experts. For example, an expert search can search for experts associated searches by examining the tags written about the expert, documents that the experts have written which are associated with tags, or tags that the expert creates. The expert search can automatically occur along with a document search.

In one embodiment of the present invention, searching for experts can be based on search terms. For example, experts can be returned based on their association with the objects found in a search. The objects can be, for example, documents associated with users, tags associated with users, or user profile pages.

The system can allow end-users to more easily locate experts. End-users can be able to directly identify another end-user as an expert by adding a tag with that user. For example, an end-user can be able to indicate that "Jane Smith" is an expert on "java" by associating the "java" tag to Jane. The application can also derive experts from usage statistics.

In some cases, users will not be able to find the information they are looking for. This might be because the user is looking in the wrong location, or the user is looking for a level of detail that is not covered in the available content. Some users just prefer to talk to people instead of reading a document. In each of these circumstances, users will want to locate other individuals who might be able help them fulfill their knowledge discovery needs. Expert identification can include returning a list of experts based on a search query for documents.

The system can derive the panel of experts using tracked user actions. For example, the author of the most relevant document in a result set can be identified as one of the experts. Each user can be measured based on the same set of metrics to determine that user's expertise score.

The expertise score can be determined from metrics such as, links between users and documents (authorship, submitting tagging, viewing); links between users (users tagging other users); and text in the user profile page (if the search matched any of tags applied to the user).

The users with the top scores can be displayed by default. An administrator can be able to set the number of users that are displayed from the administrative interface.

Users can also be able to tag other users. As noted above, these tags can also be used when deriving the panel of experts. In one embodiment, of the various metrics, the text in the user profile page will be weighted the highest.

For example, if Jane has been tagged with the term "java guru", then Jane can be returned at or near the top of the list of experts when a user searches for java guru or clicks the java guru tag.

Experts can be displayed in a separate pane in the search page. Clicking on a user's name in the list can open up the user's profile page.

In some cases, it can be advantageous for end-users if they can create a private library of information. The system can allow users to create both personal and custom libraries of tags. Personal tags can be explicitly associated with a single user. In one embodiment, no other end-user will be able to edit the personal tags. Custom views can be controlled using a common security service as an underlying foundation. Through this mechanism, end-users can be able to combine the information contributed by any combination of users any groups to create a custom library. Security on the documents within each view can still be respected across the application. If a user creates a new tag and associates it with a particular document, a different user will only be able to see that tag if they have access to the document itself. Through this methodology, the system can leverage the common security service to create virtual libraries of knowledge without being forced actually segment the information.

The system can allow users with the appropriate capability to create multiple views of the information. A view can be a filter on the information in the system. These filters can be applied to tags and usage statistics. In one embodiment, document display will be determined by security.

Everyone: This view can be the default view in the system. It can display all tags and all usage history can be used to rank result sets. This view may also be referred to as the global view.

Personal: Unlike the global view, the personal view can display only those tags which have been applied by a single-user. Each user will be able to toggle to their personal view.

Custom: End-users can be able to define custom views as well. In custom views an end-user can select the user(s) and group(s) that will be considered part of the view. Custom views can filter the tags only to those tags which have been associated with content by members of the specified view. The users and groups are the same entities that exist in the deployment. Usage history can also be filtered by group view. Content can have a different ranking from one group to the next. This will allow groups to define content as it is relevant to them without vying for relevance with another definition. For examples two users may be looking for entirely different sets of information when they each submit the term operator. Group delineation can satisfy this need by allowing the information that is relevant to each group to bubble up to the top of the result set through usage history. The number of views that each user can define can be determined by an administrator.

An end-user can select experts and elect to preview the view using those experts as criteria. From the preview view UI, an end-user can elect to create a new view or add the users (experts) to an existing custom view. An end-user can also elect to select, create, edit, or delete a custom view using a custom view menu.

End-users can be able to execute both full-text and parameterized queries. Full-text queries can search within all of the content that is indexed for each object. Parameterized queries can allow end-users to query specific properties or metadata.

Figure 5:
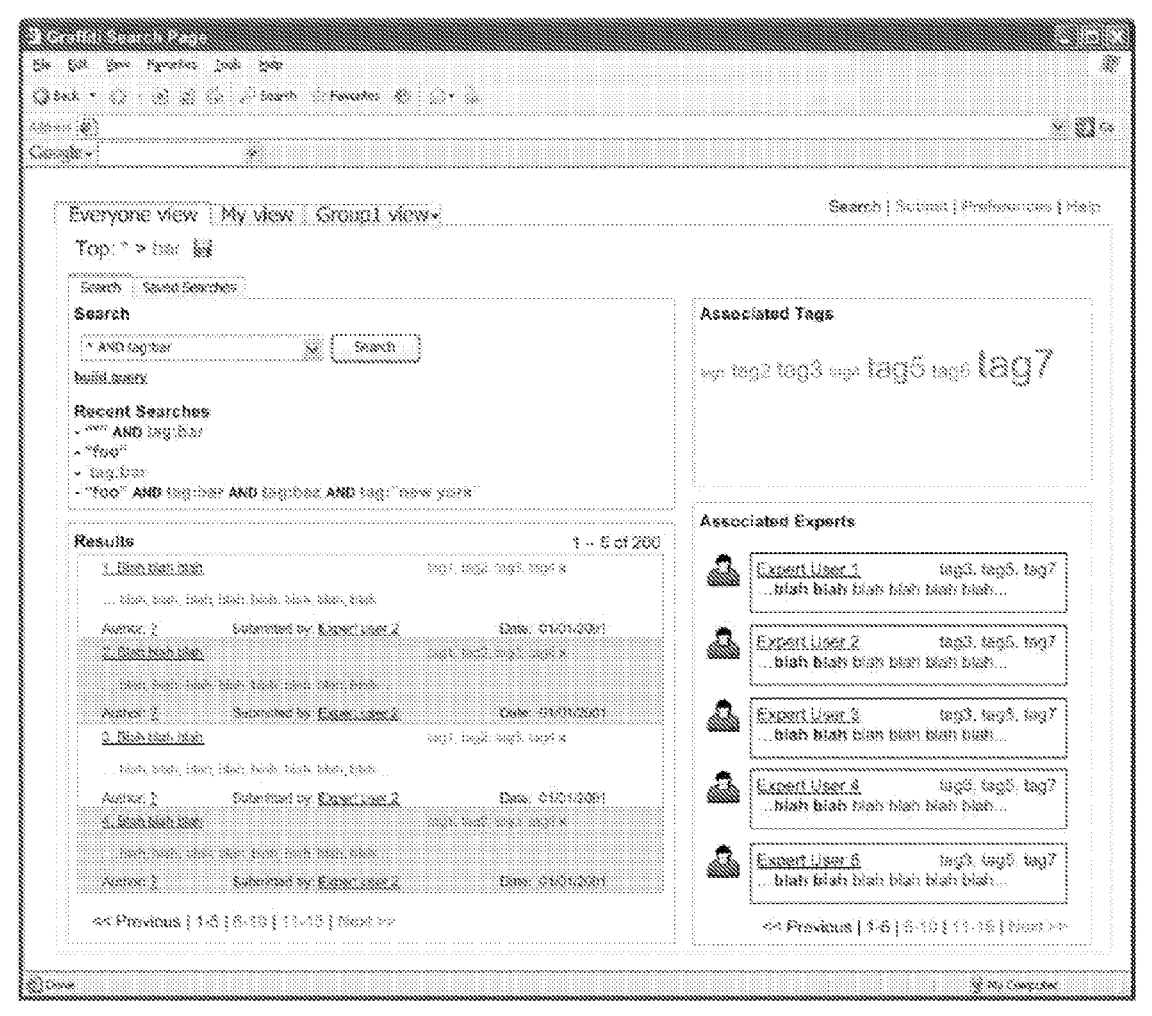

FIG. 5 shows a representative search page. Each search can return a content result set, a set of associated tags, as well as a list of experts on the result set. The display of experts can be something, that an administrator can disable. The content and expert results can be returned based on the rank associated with each object in the system. The set of associated tags that are displayed can be determined by the end user's preference and the tags that are associated with the content in the result set.

The system can provide user preferences and advanced search options. The advanced options can include sorting, filtering, metadata display, the content query, language, and right-click options.

Users can sort result sets based on any column heading the in the results pane. This can include the ability to sort by relevance, name, object type, last modified date, and author Results can be sorted by query relevance by default for each end-user session. Any changes to the sorting preference can be enabled for the remainder of the end-user's session. When a result set is sorted by a property that has multiple equal values, query relevance will be used as the secondary result ordering.

An advanced query, build can allow an end-user to build a complex query without understanding the content query language. They can select words to include (or exclude) from the search results. End-users can search for explicit tags using the advanced search UI. Users can also filter their result set based on the value of a particular property on the content.

Users can also be able to determine which properties are displayed in the details section of each document result. Similarly, to property filtering, the list of available properties can be determined by the properties that are defined as searchable.

Users can also be able to explicitly execute a parameterized search either through search query language or an advanced search UI. For example the query, author: Jane, can query the objects to return results which contain "Jane" as part of the value for the "author" property.

The system can use a query independent way of assigning a rank to users, tags and pages. This can be computed ahead of time in order to improve performance, and it can be combined with the term frequency search algorithm to achieve good ranking in search results.

The search independent rank calculation can be done periodically. There can be a threshold number of searchable objects and user activity which can force the customer to install the search independent Rank Engine on a separate machine from the web server.

Figure 7A:
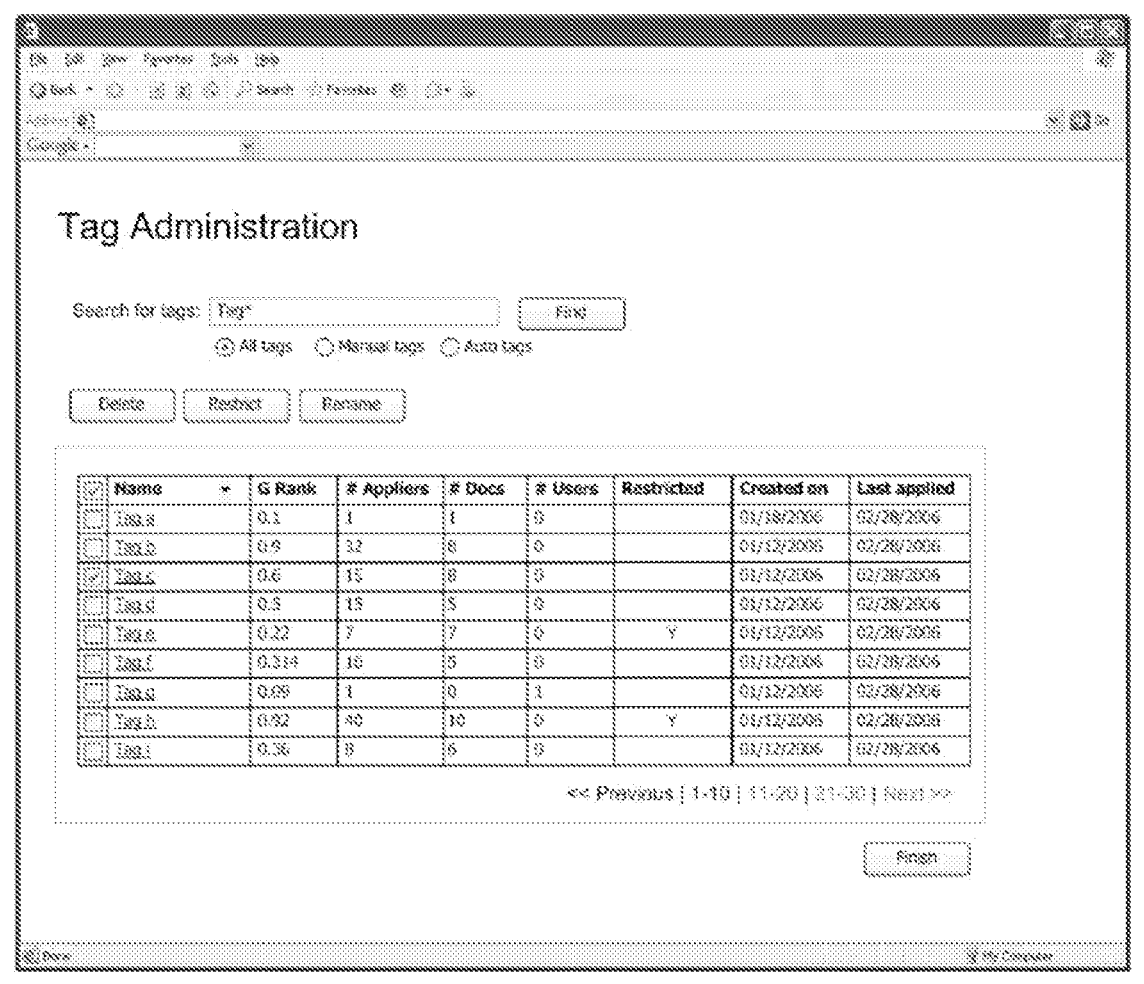

Application administrators can use an administrative interface to modify or delete tags. In this interface, administrators can be able to perform these operations against a single tag or al instances of a tag. FIG. 7A shows an exemplary tag administration interface. From this UI, administrators can search for any tag that is in the system. Administrators can also restrict their search to manual tags auto tags, or all tags. The interface can display the information about each tag such as, name, Rank score, total number of people who have applied the tag, total number of documents the tag has been associated with, total number of users the tag has been associated with, if the tag is restricted, date the tag was created and date the tags was last applied.

The administrator can delete or rename a tag, by selecting the checkbox next to the tag and selecting the delete or rename buttons respectively. The administrator can also restrict a tag (mark it as inappropriate) by selecting the checkbox and selecting the restrict button. If an administrator restricts a tag, which is already in use, then the application can warn the administrator that the tag already exists.

Figure 7B:
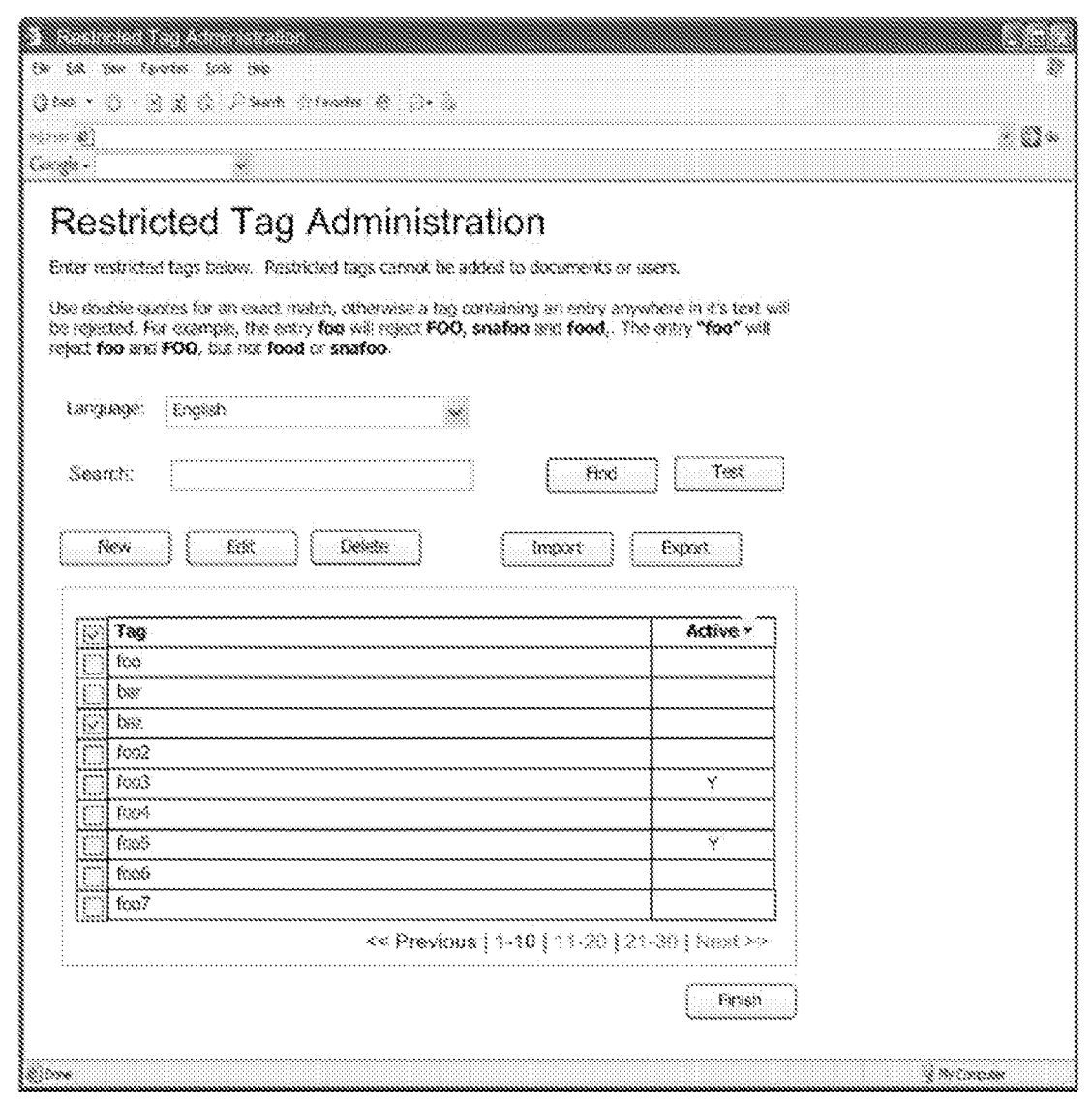

Administrators can have the ability to add and delete terms from a list of restricted tags, as shown in FIG. 7B. Restricted tags are terms that cannot be used as tags on documents or users. Administrators can also have the ability to bulk upload a list of inappropriate words. Inappropriate tags can also be stemmed and they will apply to multi-word tags. For example, if an administrator adds "idiot" to the list. Then both "idiots" and "idiot proof" can be automatically disallowed.

Administrators can also be able to administrate auto-tags. Auto-tags are tags that are programmatically applied to content. This feature can be commonly used when content is imported. Auto-tagging can also be used during the initial product installation to seed an existing index with tags. Auto-tag values can be reconciled after they have been created. For example if the value in an auto-aging rule changes, then the values that were previously applied via that rule can be modified if a rule is deleted then all values that were applied via that rule can be deleted.

Administrators can define auto-tagging rules through a simple rules administrator. Rules can be associated with specific folders within the system hierarchy. Each rule can also be associated with a particular object type and content type if the target object(s) are documents. Each folder, object type and document type can have multiple rules associated with it. Auto-tagging values can be either an explicit string or the value of a property. The list of applicable properties can be determined by the document properties that are associated with the specific object type. An administrator will have the ability to control tags on end-users. A role-based security model can be used based on an Access Control Lists (ACL) management.

A role can be a collection of capabilities, or rights. Every object type in the system can have associated with it a set of capabilities such as create, read, update, manage and delete. For a given role, users can define a set of capabilities for each object type; for example, the 'Librarian' role might have the ability to create and prescribe Views, where the 'Tagging User' role may instead have the ability to create Views, but not prescribe them. Once a role is defined, user/groups can then be mapped to those roles.

The system can have a set of out-of-the-box roles to which users can be mapped. These roles are intended to help customers get a head start in securing their system.

Custom roles can also be defined. Users and groups can be mapped to roles. When a user or group is mapped to a role, they can inherit the capabilities afforded by that role.

Correct resolution of content authors to users can be important for the expert system. In order to achieve this there can be an administrative UI where an administrator can select an end-user and apply all of the aliases that this user might be identified as. This list can be prioritized from top to bottom. So when a document is imported into the system, the author can be resolved to the first user in the list with a matching alias. Customers can also use an asterisk to indicate a wildcard match. This can be used to make sure that a specific user is applied as the author in the event that no explicit match is found. If the wildcard is not used and no match is found, then the value in the author property will be displayed as the "author" of the page. This can also be denoted as "unqualified" (i.e. not confirmed) in the UI.

The browser toolbar can provide the system a full-time browser presence. It can also provide users an easy mechanism to search submit, and tag content. Rather than navigating to the application and submitting via the system UI, the end-user can be able to interact directly with system from any location on the web.

An office toolbar can allow end-users to easily submit an office document to the system without leaving the native office application. Similar to the browser toolbar, when a user elects to submit a document via the office toolbar, they can have the ability to define the title and tags associated with the document in the system.

In one embodiment, the font size of the tags is determined by the search-independent ranks of the tags. Tags with a greater rank can have a greater tag font size. This can aid users by indicting the more valuable tags.

End-users can be able to browse tags. A variety of UI implementations can be used for tag navigation. The system may incorporate all, some or one of these implementations based on ongoing UI discussions.

Tag Cloud: This is the most common tag navigation mechanism used today. In the tag cloud each tag's font weight can determined by the number of documents associated with it. So tags with a large number of documents will display as larger tags, and can be thought of as "broader" categories. The search-independent ranks of the tags can also be used.

Tag List: The tag list is a simple method for tag display. In the tag list, each tag can be displayed using the same fount weight. The number of documents associated with each tag should be displayed as well. Users can be able to sort the tag list alphabetically or by the number of associated documents.

Tag Tree: The tag hierarchy could also be displayed in a windows-like tree structure. In this navigation paradigm, each tag can be displayed as a fonder. In this UI a tag could be the child of multiple folders.

Administration Console to Select Rank Factors

One embodiment of the present: invention is an administration console that: allows a user to input rank factors. The rank factors can be used to adjust the operation of the system. The administration console can use a graphical element, such as a slider, to allow users to select the relative weights.

An exemplary rank factor is an indication of the relative weight of search-independent ranks and text matching and a search component to use the relative weight indication to order the results of searches.

A linear combination of the search independent ranks and the text matching can be used to order the search results. A relative weight indication can be used to determine the linear combination.

Figure 6A:
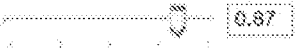
FIGS. 6A-6B illustrate administration console pages for selecting rank factors.

FIG. 6A shows an exemplary page for setting rank factors and the half-life of some transactions.

Administrators can have the ability to modify the values in the rank-scoring algorithm. In addition, they can take snapshots of the values so that they can be used later. This can ease administration since the administrator will not be forced to document the various values before changing them.

Figure 6B:
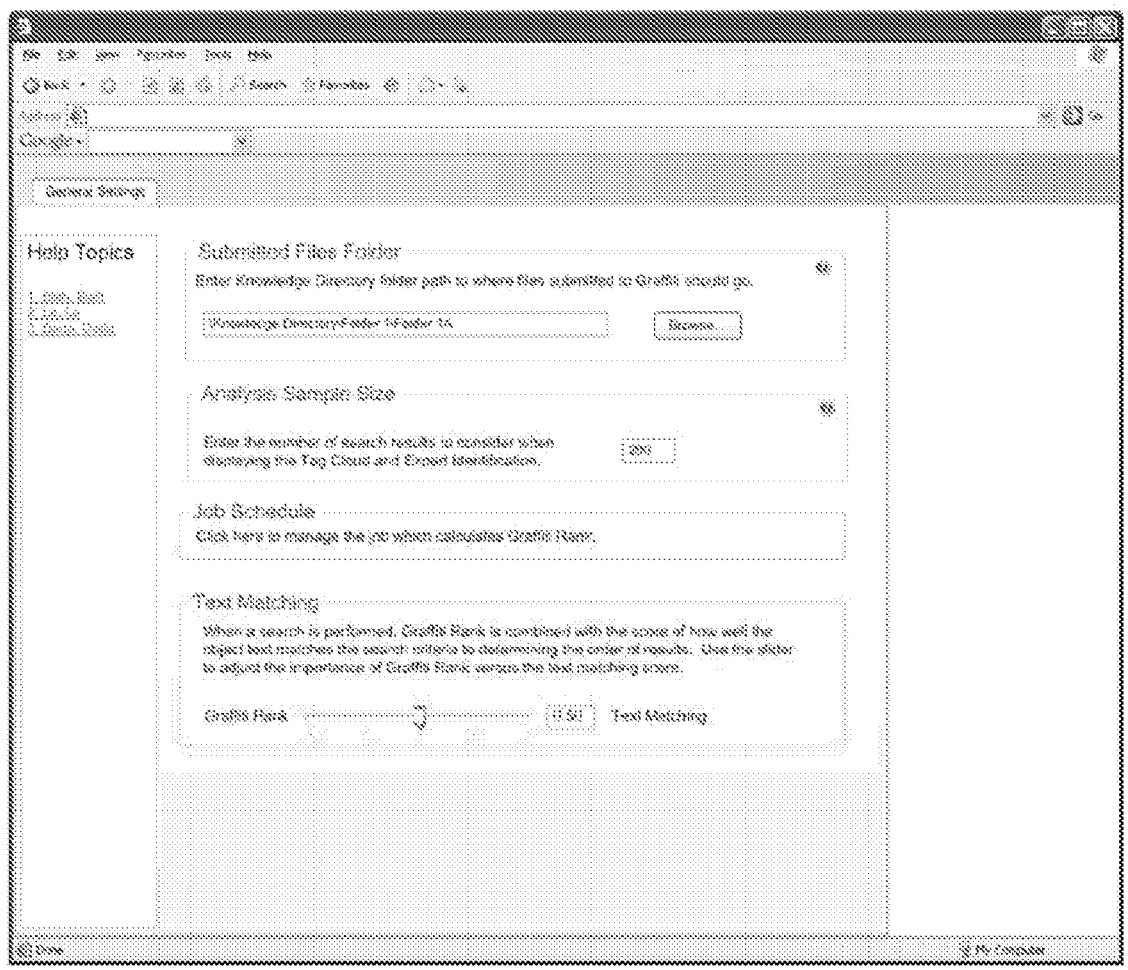

FIGS. 6A and 6B show exemplary ranking factors that can be modified for objects, such as documents, users, and tags. In this example, each factor can be modified using the slider or by modifying the value in the text box to values between 0 and 1.

The administration console can allow a user to select an indication of how the importance of certain actions to search-independent ranks decreases over time and a search component to update the search independent ranks using the indication. The indication can be a half life indication that reflects the decrease of the importance of a user viewing or tagging an object over time.

Over time the documents that are tagged and viewed the most can continue to rise in the result set. This can create a positive feedback loop since many users often open one or more results at the top of the result set, regardless of relevance. In order to mitigate this cycle, administrator can define the half-life for these values. The half-life can allow an administrator to make the tags applied and number of views less valuable over time. The shorter the half life, the quicker the application will "forget" about the previous tags applied or views of the content.

FIG. 6B outlines miscellaneous settings that an administrator can be able to set. Manual submissions to the system can upload the document to a directory. The administrator can have the ability to define the target folder via these settings. The administrator can also define the analysis sample size. This is the number of search results that the application will consider when displaying both the associated tags and experts. From this UI, the customer can also modify, the scheduling of the operation that calculates the rank on each object. Administrators can also determine the balance between search-independent ranking and the term frequency ranking built into the Search.

A statistics collection component can be used to collect statistics concerning user interaction with search result pages. The administration console can allow the display of comparisons of statistics collected on searches with different selected indications. This can allow the user to tweak the values to improve the search function.

The administration console can display, a comparison of the order of selected objects on searches with the different indication values. Statistics can include an indication of the average order of a selected object in response to a search.

An admin page can let administrators analyze how the rank was determined for a particular object and general data on how successful end user searches are. In one embodiment, the following metrics can be available for the administrator: total number of documents, total number of users/experts and total number of tags. In addition to the totals listed above, administrators can have the ability view the metrics below. Exemplary metrics can include total documents accessed and % of total available, total tags accessed and % of total available, total users active and % of total available, total experts accessed and % of total available, average rank of document access (normalized against the size of all result sets), average rank of expert access (normalized against the size of all result sets) and total number of orphaned searches.

An administrator can also be able to select any object in the system and view the values from the ranking algorithm that determine that objects overall rank in the system. This can help administrators to understand why some objects are ranked very high and why others are not.

Usage tracking can help the system improve the quality of results for the end-user. First, through the analysis of tracked events the system can improve the ranking of result sets that, are returned against a particular search. For example, the application can track the fact that most users after searching for "operator" or clicking on the "operator" tag all opened the same document. With this quantitative calculation, the application can increase the relevancy ranking of the document for future searches on "operator". Conversely, the relevance ranking of documents associated with "operator" that are rarely accessed can decrease at the sample rate.

Usage tracking can also help the application suggest terms or documents that might be related or worth review. In one example, if many users who searched "operator" also searched for "conductor", the system could suggest the additional term "conductor" to users who search for "operator".

This level of usage tracking can remain anonymous to the user base. While a user can see that another user executed a series of subsequent actions when searching on the same term, users will not be able too see exactly who searched on a particular term or selected a specific document. This can help ensure user privacy.

One embodiment may be implemented using a conventional general purpose or specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily, apparent to those skilled in the art.

One embodiment includes a computer program product which is a storage medium (media) halving instructions stored thereon/in which can be used to program a computer to perform any of the features present herein. The storage medium can include, but is not limited to, any type of disk including floppy disks, optical discs, DVD, CD-ROMs, micro drive, and magneto-optical disks ROMs, RAMs, EPROMs, EEPROMs DRAMs, flash memory of media or device suitable for storing instructions and/or data stored on any one of the computer readable medium (media), the present invention includes software for controlling both the hardware of the general purpose/specialized computer or microprocessor and for enabling the computer or microprocessor to interact with a human user or other mechanism utilizing the results of the present invention. Such software may include, but is not limited to, device drivers, operating systems execution environments/containers, and user applications.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method comprising:
receiving, by a computer system from one or more users, a first plurality of tags to be associated with documents in an enterprise;
associating, by the computer system, the first plurality of tags with the documents;
receiving, by the computer system from one or more users, a second plurality of tags to be associated with individuals in the enterprise;
associating, by the computer system, the second plurality of tags with the individuals;
receiving, by the computer system, a search query including a tag;
determining, by the computer system, a list of documents based on the search query, the list of documents including one or more documents in the enterprise that are associated with the tag;
determining, by the computer system, a list of experts based on the search query and the list of documents, the list of experts including one or more individuals in the enterprise that are associated with the tag and one or more individuals in the enterprise that are knowledgeable about subject matter described in one or more documents in the list of documents; and
generating, by the computer system, a user interface including the list of documents and the list of experts,
wherein a rank value is determined for each document in the list of documents based on one or more connections between the document and individuals in the enterprise,
wherein each document in the list of documents is ordered according to its rank value,
wherein a rank value is determined for each expert in the list of experts based on one or more connections between the expert and documents in the enterprise and one or more connections between the expert and other individuals in the enterprise,
wherein the experts in the list of experts are ordered according to their rank values;
wherein one or more coefficients are calculated for the one or more connections between the document and individuals in the enterprise, and
wherein the rank value for each document is calculated based on the one or more coefficients, the calculating comprising:
(a) for each row of a core data structure:
reading a row of the core data structure into a local memory,
inflating the row,
converting the row into a row of a damped matrix, and
multiplying the row of the damped matrix by a current vector to get a value of a next vector; and
(b) comparing the next vector to the current vector, wherein if a difference between the next vector and the current vector is greater than an error value, setting the next vector as the current vector and repeating step (a), and wherein if the difference is less than the error value, determining rank values from the next vector.

2. The method of claim 1 further comprising automatically creating a tag for a document in the enterprise by:
retrieving a first term associated with the document, wherein the first term corresponds to a location of the document or to metadata associated with the document; and
applying a translation rule to convert the first term into a second term used in the tag.

3. The method of claim 1 wherein the one or more connections between the document and individuals in the enterprise include an authoring relationship.

4. The method of claim 1 further comprising displaying the tag in the user interface, wherein the tag is displayed at a size indicating a rank value for the tag.

5. The method of claim 1 wherein the damped matrix is column stochastic.

6. The method of claim 1 wherein the damped matrix is positive.

7. A machine-readable storage medium having stored thereon program code executable by a computer system, the program code comprising:
code that causes the computer system to receive, from one or more users, a first plurality of tags to be associated with documents in an enterprise;
code that causes the computer system to associate the first plurality of tags with the documents;

code that causes the computer system to receive, from one or more users, a second plurality of tags to be associated with individuals in the enterprise;

code that causes the computer system to associate the second plurality of tags with the individuals;

code that causes the computer system to receive a search query including a tag;

code that causes the computer system to determine a list of documents based on the search query, the list of documents including one or more documents in the enterprise that are associated with the tag;

code that causes the computer system to determine a list of experts based on the search query and the list of documents, the list of experts including one or more individuals in the enterprise that are associated with the tag and one or more individuals in the enterprise that are knowledgeable about subject matter described in one or more documents in the list of documents; and code that causes the computer system to generate a user interface including the list of documents and the list of experts, wherein a rank value is determined for each document in the list of documents based on one or more connections between the document and individuals in the enterprise, wherein each document in the list of documents is ordered according to its rank value, wherein a rank value is determined for each expert in the list of experts based on one or more connections between the expert and documents in the enterprise and one or more connections between the expert and other individuals in the enterprise, wherein the experts in the list of experts are ordered according to their rank values;

wherein one or more coefficients are calculated for the one or more connections between the document and individuals in the enterprise, and wherein the rank value for each document is calculated based on the one or more coefficients, the calculating comprising:

(a) for each row of a core data structure:
reading a row of the core data structure into a local memory,
inflating the row,
converting the row into a row of a damped matrix, and
multiplying the row of the damped matrix by a current vector to get a value of a next vector; and (b) comparing the next vector to the current vector, wherein if a difference between the next vector and the current vector is greater than an error value, setting the next vector as the current vector and repeating step (a), and wherein if the difference is less than the error value, determining rank values from the next vector.

8. The machine-readable storage medium of claim 7 wherein the program code further comprises code that causes the computer system to automatically create a tag for a document in the enterprise by:

retrieving a first term associated with the document; and
applying a translation rule to convert the first term into a second term used in the tag.

9. The machine-readable storage medium of claim 8 wherein the first term is metadata associated with the document.

10. The machine-readable storage medium of claim 8 wherein the first term is a document hierarchy name.

11. The machine-readable storage medium of claim 7 wherein the one or more connections between the document and individuals in the enterprise include an authoring relationship.

12. The machine-readable storage medium of claim 7 wherein the program code further comprises code that causes the computer system to display the tag in the user interface, wherein the tag is displayed at a size indicating a rank value for the tag.

13. The machine-readable storage medium of claim 7 wherein the damped matrix is column stochastic.

14. The machine-readable storage medium of claim 7 wherein the damped matrix is positive.

15. A system comprising:

a processing component configured to:
receive, from one or more users, a first plurality of tags to be associated with documents in an enterprise;
associate the first plurality of tags with the documents;
receive, from one or more users, a second plurality of tags to be associated with individuals in the enterprise;
associate the second plurality of tags with the individuals;
receive a search query including a tag;
determine a list of documents based on the search query, the list of documents including one or more documents in the enterprise that are associated with the tag;
determine a list of experts based on the search query and the list of documents, the list of experts including one or more individuals in the enterprise that are associated with the tag and one or more individuals in the enterprise that are knowledgeable about subject matter described in one or more documents in the list of documents; and
generate a user interface including the list of documents and the list of experts, wherein a rank value is determined for each document in the list of documents based on one or more connections between the document and individuals in the enterprise, wherein each document in the list of documents is ordered according to its rank value, wherein a rank value is determined for each expert in the list of experts based on one or more connections between the expert and documents in the enterprise and one or more connections between the expert and other individuals in the enterprise, wherein the experts in the list of experts are ordered according to their rank values, wherein one or more coefficients are calculated for the one or more connections between the document and individuals in the enterprise, and wherein the rank value for each document is calculated based on the one or more coefficients, the calculating comprising:

(a) for each row of a core data structure:
reading a row of the core data structure into a local memory,
inflating the row,
converting the row into a row of a damped matrix, and
multiplying the row of the damped matrix by a current vector to get a value of a next vector; and (b) comparing the next vector to the current vector, wherein if a difference between the next vector and the current vector is greater than an error value, setting the next vector as the current vector and repeating step (a), and wherein if the difference is less than the error value, determining rank values from the next vector.

16. The method of claim 1 wherein the list of experts includes an author of the document and a user that has tagged the document.

17. The method of claim 1 wherein the rank value for each expert is calculated based on one or more user tags associated with the expert.

18. The machine-readable storage medium of claim 8 wherein the first term is a folder name.

* * * * *

UNITED STATES PATENT AND TRADEMARK OFFICE
CERTIFICATE OF CORRECTION

PATENT NO.        : 7,873,641 B2
APPLICATION NO.   : 11/461565
DATED             : January 18, 2011
INVENTOR(S)       : Kurt Frieden et al.

Page 1 of 3

It is certified that error appears in the above-identified patent and that said Letters Patent is hereby corrected as shown below:

On page 2, in column 2, under "Other Publications", line 16, delete "71" and insert -- 27 --, therefor.

On sheet 7 of 12, in Figure 4, Ref. Numeral 410, line 1, delete "Covert" and insert -- Convert --, therefor.

In column 1, line 16-17, delete "disclosures" and insert -- disclosure, --, therefor.

In column 2, line 9, delete "1." and insert -- 1: --, therefor.

In column 2, line 14, after "ranks" insert -- of --.

In column 2, line 40, delete "embodiments," and insert -- embodiment, --, therefor.

In column 2, line 59, delete "tar" and insert -- tag --, therefor.

In column 3, line 32, delete "damping" and insert -- damping, --, therefor.

In column 3, line 60, delete "of" and insert -- or --, therefor.

In column 4, line 4, delete "embodiment" and insert -- embodiment, --, therefor.

In column 4, line 10, delete "row" and insert -- row of --, therefor.

In column 4, line 21, delete "core," and insert -- core --, therefor.

In column 4, line 39, delete "row" and insert -- row of --, therefor.

In column 4, line 45, delete "$g_k[k]$" and insert -- $g_k[j]$ --, therefor.

Signed and Sealed this
Twenty-seventh Day of December, 2011

David J. Kappos
*Director of the United States Patent and Trademark Office*

CERTIFICATE OF CORRECTION (continued)
U.S. Pat. No. 7,873,641 B2

In column 5, line 14, delete "rigid" and insert -- rigid, --, therefor.

In column 5, line 66, delete "as," and insert -- as: --, therefor.

In column 5, line 66-67, delete "submitting" and insert -- submitting, --, therefor.

In column 6, line 2, delete "of" and insert -- of the --, therefor.

In column 6, line 25, delete "any" and insert -- and --, therefor.

In column 6, line 56, delete "examples" and insert -- example, --, therefor.

In column 7, line 8, delete "something," and insert -- something --, therefor.

In column 7, line 16, delete "query," and insert -- query --, therefor.

In column 7, line 27, delete "query," and insert -- query --, therefor.

In column 7, line 30, delete "results." and insert -- result. --, therefor.

In column 7, line 55, delete "al" and insert -- all --, therefor.

In column 7, line 58, delete "tags" and insert -- tags, --, therefor.

In column 7, line 65, delete "tag," and insert -- tag --, therefor.

In column 8, line 19, delete "auto-aging" and insert -- auto-tagging --, therefor.

In column 8, line 20-21, delete "modified if" and insert -- modified. If --, therefor.

In column 8, line 27, delete "type" and insert -- type, --, therefor.

In column 8, line 34, delete "Lists" and insert -- List --, therefor.

In column 8, line 43, delete "user" and insert -- users --, therefor.

In column 8, line 67, delete "search" and insert -- search, --, therefor.

In column 9, line 25, delete "fount" and insert -- font --, therefor.

In column 9, line 31, delete "fonder." and insert -- folder. --, therefor.

In column 9, line 34, delete "present:" and insert -- present --, therefor.

CERTIFICATE OF CORRECTION (continued)
U.S. Pat. No. 7,873,641 B2

In column 9, line 35, delete "that:" and insert -- that --, therefor.

In column 10, line 16, delete "modify," and insert -- modify --, therefor.

In column 10, line 20, delete "Search." and insert -- search. --, therefor.

In column 10, line 27, delete "display," and insert -- display --, therefor.

In column 10, line 38, delete "include" and insert -- include: --, therefor.

In column 10, line 52, delete "that," and insert -- that --, therefor.

In column 10, line 60, delete "sample" and insert -- same --, therefor.

In column 11, line 2, delete "too" and insert -- to --, therefor.

In column 11, line 15, delete "readily," and insert -- readily --, therefor.

In column 11, line 17, delete "halving" and insert -- having --, therefor.

In column 11, line 22, delete "disks" and insert -- disks, --, therefor.

In column 11, line 23, delete "EEPROMs" and insert -- EEPROMs, --, therefor.

In column 11, line 27, delete "microprocessor" and insert -- microprocessor, --, therefor.

In column 11, line 31, delete "systems" and insert -- systems, --, therefor.